United States Patent [19]

Manley et al.

[11] 4,310,721

[45] Jan. 12, 1982

[54] HALF DUPLEX INTEGRAL VOCODER MODEM SYSTEM

[75] Inventors: Harold J. Manley, Sudbury; Joseph de Lellis, Jr., Walpole, both of Mass.

[73] Assignee: The United States of America as represented by the Secretary of the Army, Washington, D.C.

[21] Appl. No.: 114,777

[22] Filed: Jan. 23, 1980

[51] Int. Cl.³ .............................................. G10L 1/00
[52] U.S. Cl. .................................... 179/1 SA; 375/8; 364/725
[58] Field of Search ............ 179/1 SA, 1 SC, 81 VF; 370/31, 50, 70; 455/78, 83, 84; 375/8; 364/725

[56] References Cited

U.S. PATENT DOCUMENTS

| | | | |
|---|---|---|---|
| 3,617,941 | 11/1971 | de Lellis | 332/16 R |
| 3,634,668 | 1/1972 | Shaffer | 235/156 |
| 3,662,108 | 5/1972 | Flanagan | 179/1 S A |
| 3,681,530 | 8/1972 | Manley et al. | 179/1 SA |
| 3,706,929 | 12/1972 | Robinson et al. | 375/8 |
| 4,013,956 | 3/1977 | Dornaus et al. | 375/8 |
| 4,085,449 | 4/1978 | Walsh et al. | 375/8 |

Primary Examiner—Edward J. Wise
Assistant Examiner—E. S. Kemeny

Attorney, Agent, or Firm—Nathan Edelberg; Jeremiah G. Murray; Edward Goldberg

[57] ABSTRACT

Disclosed is a system whereby in a transmit mode analog speech is sampled and converted digitally to 12 bits of accuracy and then fed into a fast Fourier transform (FFT) processor which analyzes the speech into spectral and pitch parameters. These parameters are then quantized into a data stream which acts as an input to a differential phase shift keying modulator. The modulator constructs a multi-tone modem output signal from a 25 tone stack which is converted to an analog signal which is fed into a communications channel. In the receive mode a modem input signal from the communications channel is fed through the same analog to digital converter which was used for input speech. A data stream is now provided which is coupled back into the same digital FFT processor which now operates to provide pitch spectral coefficients which are then separated and used by a synthesizer to reconstruct a speech waveform. The speech waveform is applied to a digital analog converter which is the same converter used to produce the line signal when the processor operates in the transmit mode. The FFT processor implements a single FFT algorithm which is used for both vocoder and modem processing in both the transmit and receive modes.

10 Claims, 14 Drawing Figures

FIG.5 TRANSMIT MODE

FIG. 6
RECEIVE MODE

HALF DUPLEX INTEGRAL VOCODER MODEM SYSTEM

The invention described herein may be manufactured and used by or for the Government for governmental purposes without the payment of any royalties thereon or therefor.

BACKGROUND OF THE INVENTION

This invention relates to speech compression systems and more particularly to a digital processor which combines the functions of both a vocoder and a modem in a half duplex mode of operation.

Vocoder systems function to transmit speech signals in a coded manner to reduce the transmission bandwidth which would otherwise be required if the speech was to be transmitted in an uncoded manner. Thus a vocoder system includes a transmit terminal to analyze the characteristics of the speech wave to be encoded and to encode the speech wave and a receive terminal which is used to synthesize, from the coded signal sent to it, a reconstruction of the original speech wave. Data modems on the other hand function to facilitate the transmission of data, for example data from a speech vocoder, over a transmission medium. Thus a modern includes a transmit terminal to convert the encoded data into a modulating signal which is used to modulate a carrier frequency, and a receive terminal to demodulate the received signal and thereby recover the transmitted data. Both vocoder and modem equipment are therefore required for transmission of speech signal in an efficient manner.

A known system of particular interest is disclosed in U.S. Pat. No. 3,681,530, entitled "Method and Apparatus for Signal Bandwidth Compression Utilizing The Fourier Transform Of The Logorithm Of The Frequency Spectrum Magnitude", issued to H. J. Manley, et al. There a system is described wherein an input speech waveform is converted into an electrical signal which is then digitized by an analog to digital converter. Following this the digitized signal is directed through a device where magnitudes of the frequency spectrum of the input speech wave are obtained. These magnitudes are then directed to a logging circuit to obtain a logarithm of the frequency spectrum magnitudes of the input speech signal. The log magnitudes of the frequency spectrum are then directed to a computer where the discrete Fourier transform (DFT) of the log spectrum magnitudes are obtained to form what is commonly referred to as the "cepstrum" of the input speech signal. The system also includes an analysis section of the vocoder terminal which operates to decode received data and separate it into pitch data and vocal track impulse data. Also included is a computing device for computing the logarithm of the spectrum envelope of the vocal track impulse response function using FFT techniques. A convolution unit then convolves the pitch data with the impulse response data to yield the desired synthesized speech signal.

A digital modem adapted to be utilized in conjunction with the system described in U.S. Pat. No. 3,681,530 is disclosed in U.S. Pat. No. 3,617,941, entitled "Table Look Up Modulator", which issued to J. DeLellis, Jr., one of the subject inventors, and which discloses a differential phase shift keying (DPSK) system for generating in digital form a plurality of tones at a predetermined baud rate. Both of the foregoing patents are intended to be incorporated herein by reference since they comprise a technical basis for providing a better understanding of the present invention.

Additionally a digital processor which can use the same hardware to implement both the vocoder and modem functions is disclosed in U.S. Pat. No. 3,706,929, entitled "Combined Modem and Vocoder Pipeline Processor", by J. L. Robinson, et al., which describes a processor which operates as a half duplex system, i.e. either in a transmitting or receiving mode. In the "transmit" mode, the input signal to the processor is a speech wave and the processor performs the vecoder function of speech wave analysis and the modem function of generating a modulating signal which carries the results of the speech wave analysis. This modulating signal becomes the output signal of the processor in this mode, which is used in the modulator of a conventional communications transmitting system. In the "receive" mode the input signal to the processor is a speech information bearing communications signal such as may be derived from a conventional communications receiver. The same type of modulation used in the transmit mode must be used in this mode. The processor performs the modem function of demodulating of the input signal and the vocoder function of the synthesis of the speech wave. The output signal of the processor in this mode is then used to drive conventional voice reproduction circuitry.

Acoustic signal processors employing FFT techniques are also disclosed in U.S. Pat. No. 3,662,108, entitled "Apparatus for Reducing Multi-Path Distortion of Signals Utilizing Cepstrum Technique", by J. L. Flannigan and U.S. Pat. No. 3,634,668, entitled "Log Spectrum Decoding Utilizing Symmetry", by H. L. Shaffer.

Accordingly, an object of the present invention is to provide a system including a digital processor which is particularly adapted for voice communications systems.

Another object of the present invention is to provide a system including a digital processor which is adapted to function as both the vocoder and modem in a voice security communications system.

It is a further object of the present invention to provide a system including a digital signal processor which combines the function of both a vocoder and a modem in a half duplex mode of operation.

SUMMARY

Disclosed is a vocoder modem system having a digital signal processor which implements a Fourier transform (FFT) algorithm used for both vocoder and modem processing in both the transmit and receive modes. In the transmit mode, a 256 point (sample) FFT algorithm effecting a complex DFT is used to simultaneously perform both spectrum and cepstrum analysis for pitch detection and cepstral encoding of input speech signals. The pitch and cepstral parameters provide the input to a four phase differentially coherent phase shift keying (DPSK) table look-up modulator which generates 25 digital modem tones which are converted to the audio band and transmitted over a wire line or high frequency link. In the receive mode, a 64 point complex FFT algorithm is used to perform a 128 point, real input DFT on the modem input which is first used to demodulate the tone stack of the input. The same 64 point FFT algorithm is then used again to transform the decoded cepstral parameters into a log spectrum and to an impulse response which is used with pitch information to generate an output speech waveform in a synthesizer. Synchronization is provided by an iterative difference equation filter centered on an empty slot in the tone stack.

BRIEF DESCRIPTION OF THE DRAWINGS

These and other objects of the present invention will become more fully apparent from the following detailed description taken in connection with the following drawings in which.

DESCRIPTION OF THE PREFERRED EMBODIMENTS

Figures 1, 4:
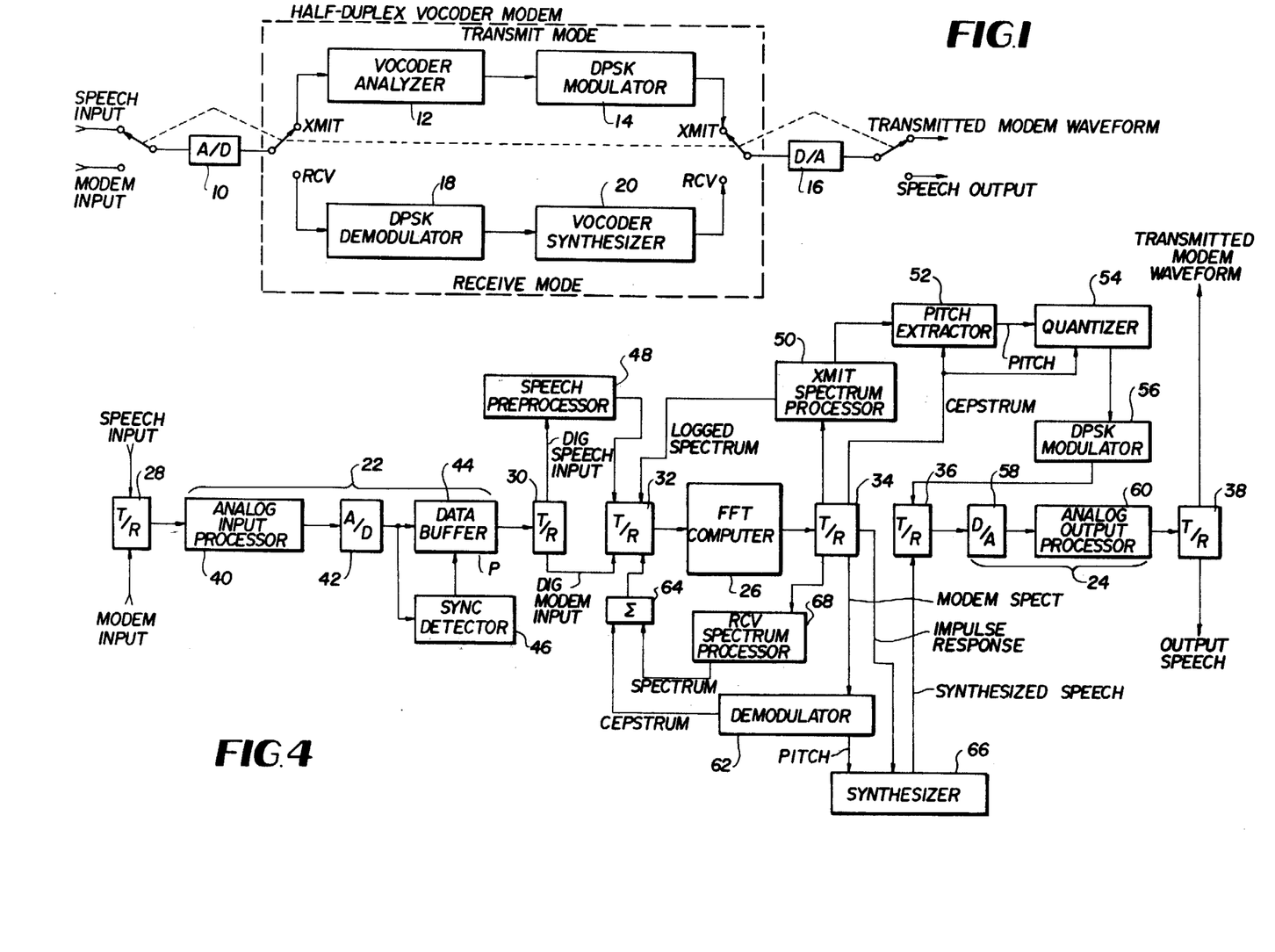
FIG. 1 is a simplified block diagram of a half duplex vocoder modem.
FIG. 4 is a block diagram illustrative of the preferred embodiment of the subject invention.

A simplified block diagram of the present invention is shown in FIG. 1. In the "transmit" mode, the input speech is sampled and digitized in analog to digital converter means 10 and fed into a computer (digital data processor) 12 which analyses the speech in the spectral and pitch parameters. These parameters are quantized into a multi-bit data stream which acts as an input to a differential phase shift keying (DPSK) modulator 14. The DPSK modulator 14 constructs a multi-tone modem signal which is then converted into an analog signal by digital to analog means 16 and fed as a transmitted modem waveform into a communications channel. In the "receive" mode, the same analog to digital converter means 10 accepts a modem input signal and outputs a digital data stream which is fed to a DPSK demodulator 18 which separates the pitch and spectral coefficients which are then used by a synthesizer 20 to reconstruct the input speech in digital form. The output speech is then converted in the digital to analog converter means 16 which was used to produce the line signal when the system operated in the transmit mode.

Figure 2:
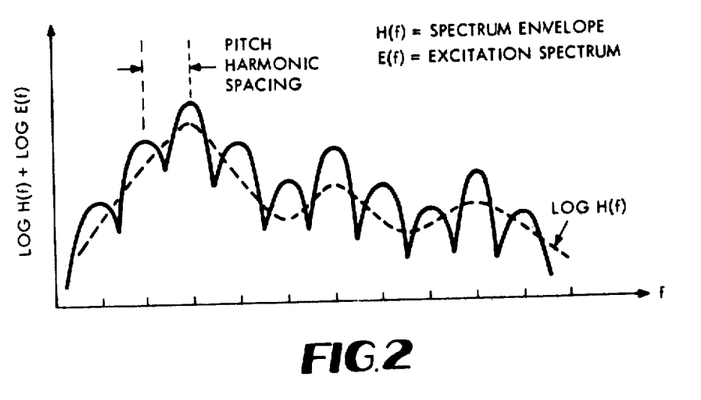
FIG. 2 is a graph illustrative of the general appearance of a logged magnitude spectrum.
Figure 3:
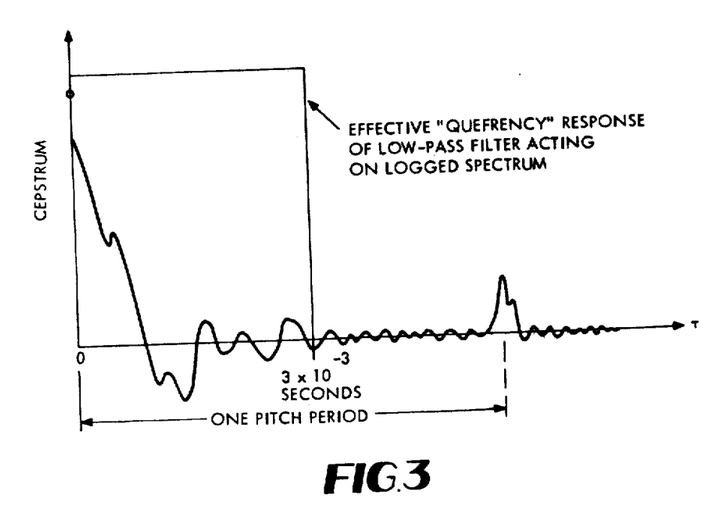
FIG. 3 is a graph illustrative of the Fourier transform of the log spectrum magnitude shown in FIG. 2.

The subject invention is an outgrowth of the FFT-cepstrum vocoder technique which has been described, for example, in the above referenced U.S. Pat. No. 3,681,530. This patent, moreover, discloses a complex 256-point fast Fourier transform algorithm hereinafter referred to simply as FFT, which is used to simultaneously generate the spectrum magnitude and cepstrum of an input speech waveform. In the FFT-cepstrum approach, a 256 sample segment of input speech is transformed to produce spectral magnitude information at 128 frequencies across the speech band. This is sufficient to resolve the pitch harmonics of voice sounds so that the spectrum envelope may be extracted without the confounding of the envelope and pitch information that occurs, for example in a channel vocoder. The resulting measured magnitude spectrum is the product of the spectrum envelope with pitch harmonic line spectrum. This product is separated into a sum by taking the logarithm of the high resolution magnitude spectrum. The general appearance of such a high resolution, logged magnitude spectrum is shown in FIG. 2. The cepstrum or FFT of this logged spectrum is shown in FIG. 3. The transform of the slowly varying part of the spectral envelope appears in the low "quefrency" or low delay part of the cepstrum below 3 milliseconds. This low delay portion is selected for quantization and transmission the effect of which is to remove the pitch harmonic ripple in the high resolution, logged magnitude spectrum by low pass filtering. This method, both theoretically and experimentally, yields the most accurate possible smooth spectrum envelope description with no confounding of pitch and spectrum envelope information.

The spectrum parameters obtained by the FFT-cepstrum vocoder are nearly uncorrolated with each other, i.e. from channel to channel, and therefore are in an efficient representation of spectrum shape from a data reduction viewpoint. They are also in an ideal form to enable the system to take advantage of corrolations from frame to frame, i.e. across time. Therefore, an interlacing technique is employed in which the low delay cepstrum values which characterize the gross spectrum shape are thus transmitted every frame and the higher order coefficients are transmitted every other frame is utilized by the quantizer. Pitch detection in the FFT-cepstrum approach is accomplished by detecting and tracking the cepstral peak which occurs in the high "quefrency" or high delay part of the cepstrum during voiced sounds. The time delay to this peak is the pitch period. The cepstral peak can be thought of as the "frequency" of the ripples in the log spectrum magnitude. Voicing is detected in the cepstrum pitch extractor by reserving both the ratio of low band to high band spectral magnitude energy and by observing the presence of a significant cepstral peak.

The present invention as will be shown employs a single N point, radix-4 FFT algorithm which is capable of operating either in the transmit or the receive modes. In the transmit mode an N=256 point complex FFT operation is performed while in the receive mode an N=64 point complex FFT is utilized to perform a 2N=128 point real input discrete Fourier transform which allows the use of the same coding in each instance.

Referring now to FIG. 4, there is disclosed a composite block diagram of the present invention. What is significant is the utilization of the same input and output sections 22 and 24, respectively, with common FFT and even/odd separator computer means 26 in both the transmit and receive modes of operation. This is carried out in accordance with the synchronous operation of a plurality of signal switching elements shown in FIG. 4 as the transmit/receive (T/R) switch blocks 28, 30, 32, 34, 36 and 38. As shown, the analog speech input and the analog modem input are both coupled to the switch block 28 which alternately operates in the transmit mode and receive mode, respectively, to couple the respective analog waveforms to an analog input processor 40 whose output is coupled to an analog to digital (A/D) converter 42. The A/D converter 42 operates to convert the signal inputted thereto to a 12 bit digital data stream which is fed into a data buffer store 44 which is adapted to accommodate 256 12-bit words in storage at a time. In the receive mode, the 12-bit data stream is additionally fed to a sync detector block 46 which operates to control the data buffer over two baud intervals in a manner to be discussed subsequently.

In the transmit mode, the T/R block 30 operates to couple the digitized speech input into a speech pre-processor 48 where it is then fed to the FFT and even-/odd separator computer means 26 through the T/R block 32. The FFT and E/O separator computer means 26 is coupled to a transmit spectrum processor 50 and to a pitch extractor 52 through the action of the T/R block 34. The output of spectrum processor 50 which comprises the logged spectrum of the FFT samples is coupled back to the input of the FFT apparatus 26 in a manner as disclosed in the aforementioned U.S. Pat. No. 3,681,530 to perform the Fourier transform of the log of the speech spectrum (cepstrum) which signals are outputted to a quantizer 54 along with the output of the pitch extractor 52. The quantized cepstrum and pitch signals are fed to a DPSK modulator 56 which forms a digital modem signal which is coupled to an output digital to analog converter 58 through the T/R block 36. The analog modem signals outputted from the converter 58 are fed to the transmission channel via an analog output signal processor (low pass filter) 60 and the T/R block 38.

Figure 6:
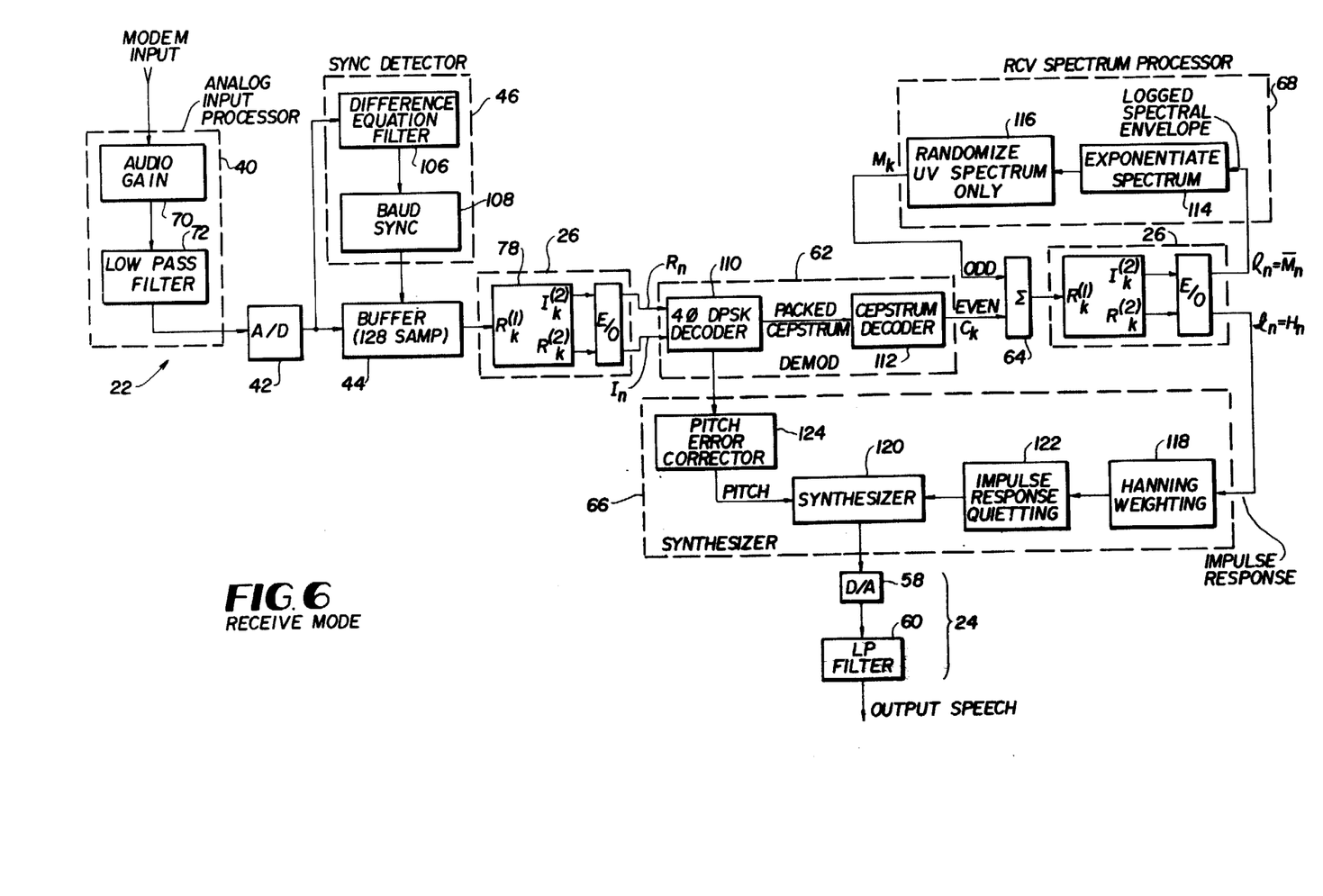
FIG. 6 is a detailed block diagram illustrative of the portion of the embodiment shown in FIG. 4 utilized in the receive mode.

In the receive mode, the analog modem input is digitized into a data stream and fed via the T/R blocks 30 and 32 to the FFT and E/O computer means 26, wherein a first pass of the data stream is made through the computer means 26 in a 64 point complex FFT routine in order to perform a 128 point real input DFT transform. The results of the first pass is outputted to a demodulator 62 where cepstrum signals are developed. These signals are fed back into the computer means 26 through a signal summer 64 and the T/R device 32. Again a 128 point real input DFT transform is formed by means of a 64 point complex FFT routine. A first portion (imaginary) of the second pass computation is fed as an impulse response signal to a synthesizer 66 while a second portion (real) is fed to a receive spectrum processor 68 which provides a feedback path back into the FFT for second pass operation of the FFT of the data. This operation will be considered further when FIG. 6 is considered. The synthesizer 66 also receives pitch information from the demodulator 62 along with the impulse response signals developed during the second 64 point complex FFT operation to provide digitized speech waveforms which are then coupled to the digital to analog converter 58 through the T/R device 36. The analog speech waveforms are then fed to the analog output processor 60 and to a transducer, not shown, through the T/R device 38.

Figure 5:
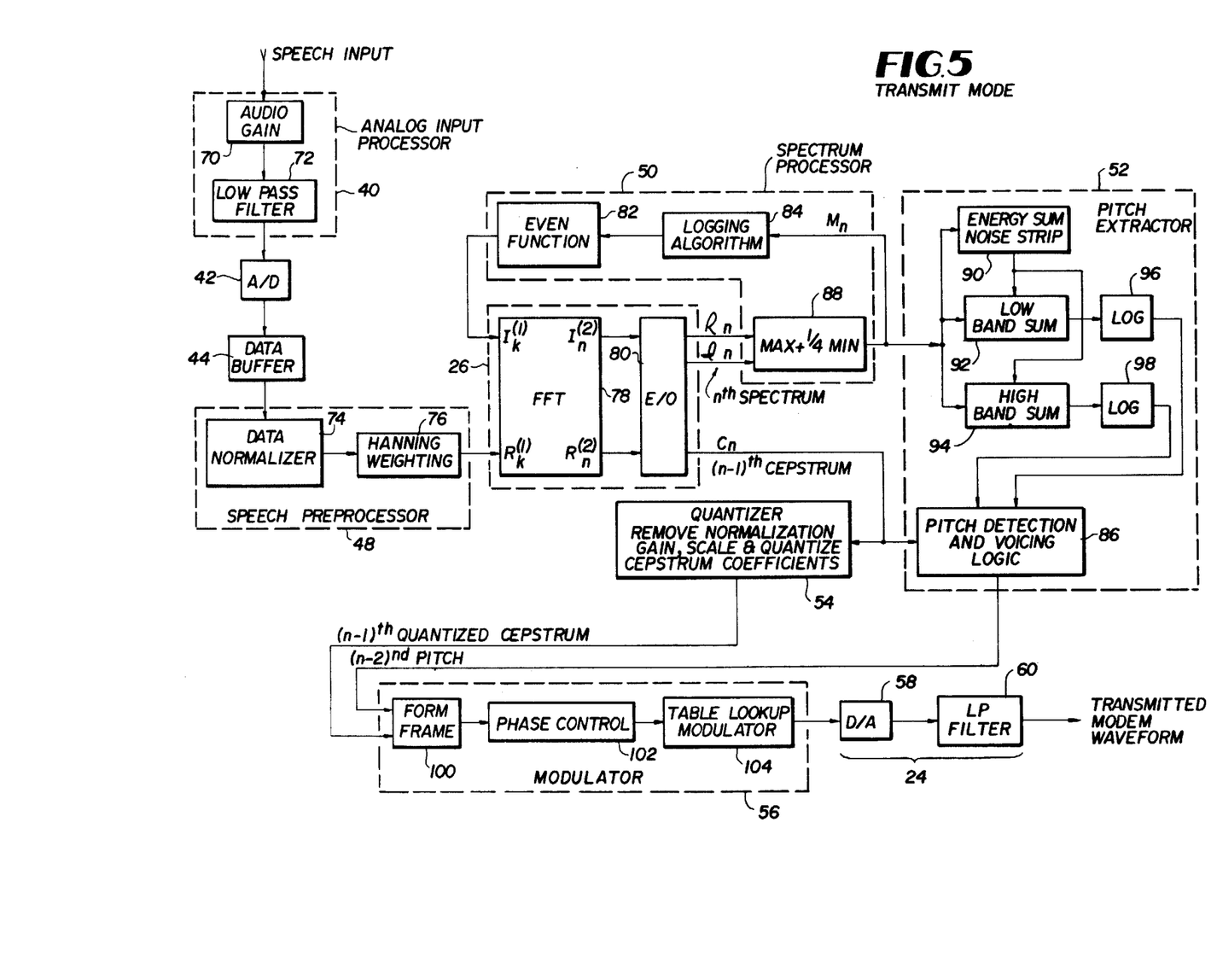
FIG. 5 is a detailed block diagram of the portion of the embodiment shown in FIG. 4 utilized in the transmit mode.

In order to more fully understand the operation of the subject invention, the separate portions of the system shown in FIG. 4 are separated and expanded in the respective transmit and receive mode apparatus shown in FIGS. 5 and 6.

Referring now to FIG. 5, shown is a detailed electrical block diagram illustrative of the means for implementing the digital processing which is performed in a transmit mode of operation. The heart of the speech analysis portion of the system is a 256-point, radix-4 FFT algorithm which is shown being performed by the block 26 which operates simultaneously to generate the spectrum and cepstrum of the speech input. The modulation section 56 functionally implements a table look-up routine, a typical example of which is disclosed in the above-referenced U.S. Pat. No. 3,617,941, and is operable to generate four phase DPSK stacked tones. The FFT routine is adapted to output data in frames at a system updating interval which is typically every 20.8 milliseconds for a 2400 bit per second (b/s) mode and every 30 milliseconds for a 1200 b/s mode.

The input speech waveform coupled from an input channel, not shown, is applied to the analog input processor 40 which is comprised of an audio gain control circuit 70 and a low pass filter 72 coupled to the output thereof. The analog input speech thus processed is fed to the analog to digital converter 42 where it is converted into a 12 bit digital form and fed serially into the buffer store 44 which is adapted to accommodate 256 12-bit words of storage during each frame interval. At the start of each frame interval, i.e. each 20.8 milliseconds or 30 milliseconds depending upon the system updating rate, the 256 samples contained in the buffer store 44 are fed into the speech pre-processor 48 which is comprised of a circuit for normalizing the input data 74 and a circuit 76 for implementing the well known Hanning weighting function. The 256 samples outputted from circuit 76 are fed into the 256-sample working storage area, not shown, of the real part input $R_k^{(1)}$ of the FFT section 79 of the computer means 26. The even/odd (E/O) separator section of the computer means 26 is designated by reference numeral 80.

The input data normalizer 74 operates by shifting an entire set of 256-input samples left or right until the most significant bit of the largest sample is typically in the 9th bit position. The sample set is then scaled up by a maximum gain of four, or scaled down by a maximum attenuation of four. The scaling factor is stored for later use in the quantizer section 54 which removes the normalization in the cepstrum before transmission.

In a manner disclosed in the above referenced U.S. Pat. No. 3,681,530 the FFT section 78 next computes the FFT transform of 256 complex samples in each time frame. The real part input $R_k^{(1)}$ corresponds to 256 speech samples to be analyzed and transmitted. The imaginary part input $I_k^{(1)}$ corresponds to 256 samples generated in the previous time frame and coupled to the spectrum processor section 50 which provides the even functions of the logarithm of the spectrum magnitude of the previous 256-input sample set.

The FFT complex output sample set $R_n^{(2)}$ and $I_n^{(2)}$ is odd/even (E/O) separated to provide two separate transforms, one of which corresponds to the spectrum of the input speech signal and is denoted as the "n-th spectrum". It is comprised of a real part $R_n$ and an imaginary part $I_n$. The other transform consists of the $(n-1)$th cepstrum and is comprised of the imaginary part $I_c$ and is derived from the previous input sample set fed back to the $I_k^{(1)}$ input. Although this type of computation is disclosed in detail in U.S. Pat. No. 3,681,530, a brief generalized statement of this technique will now be presented.

The FFT section takes an N sample, complex input vector $S_k^{(1)}$ and computes an N sample complex output vector $S_n^{(2)}$ in accordance with the discrete complex Fourier transform relation:

$$S_n^{(2)} = \sum_{k=0}^{N-1} S_k^{(1)} e^{-j2\pi \frac{nk}{N}} \quad (1)$$

where $k = 0, 1, 2, 3, \ldots N-1$, and $n = 0, 1, 2, 3, \ldots N-1$.

The complex input vector $S_k^{(1)}$ has a real part $R_k^{(1)}$ and an imaginary part $I_k^{(1)}$ so that:

$$S_k^{(1)} = R_k^{(1)} + jI_k^{(1)} \quad (2)$$

Figure 7:
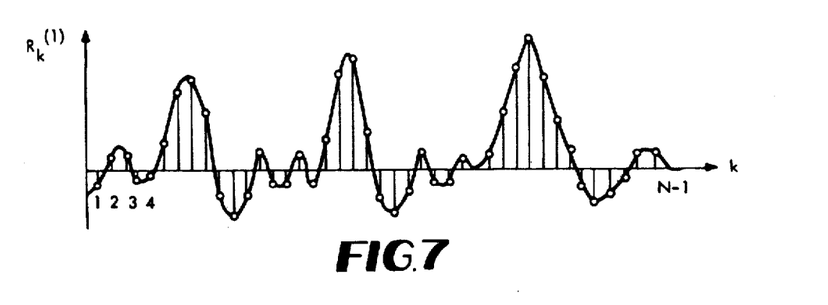
FIG. 7 is a graph illustrative of the samples of the input speech waveform fed into the FFT computer portion of the apparatus shown in FIG. 5.

The $R_k^{(1)}$ inputs are thus the samples of the input speech waveform and is comprised of the sum of the odd and even part of the N samples. FIG. 7 exemplifies such a waveform. Each sample of $R_k^{(1)}$ is stored in one of N storage locations in the FFT section 78 with the k-th sample of $R_k^{(1)}$ being in the k-th location, $k = 0, 1, 2, 3, \ldots N-1$.

Since $R_k^{(1)}$ is the sum of both even and odd functions, it will have both a non-zero discrete cosine transform $R_n$ as well as a non-zero discrete sine transform $I_n$. $R_n$ and $I_n$ are respectively samples of the real and imaginary parts of the discrete Fourier transform of the analyzed speech waveform $R_k^{(1)}$ and they are two of the outputs derived from the combined operation of the FFT section 78 and the E/O section 80 of the computer means 26. The input $I_k^{(1)}$ which is the imaginary input vector to the FFT section 78 is contained in another set of N storage locations where again the k-th sample of $I_k$ being in the k-th location. In the subject system, the even part of $I_k^{(1)}$ is made to be equal to the logarithm of the magnitude of the speech signal to be transmitted which was spectrum analyzed in the immediately past operation of the FFT section 78. The odd part of the $I_k^{(1)}$ is unused.

Figure 8:
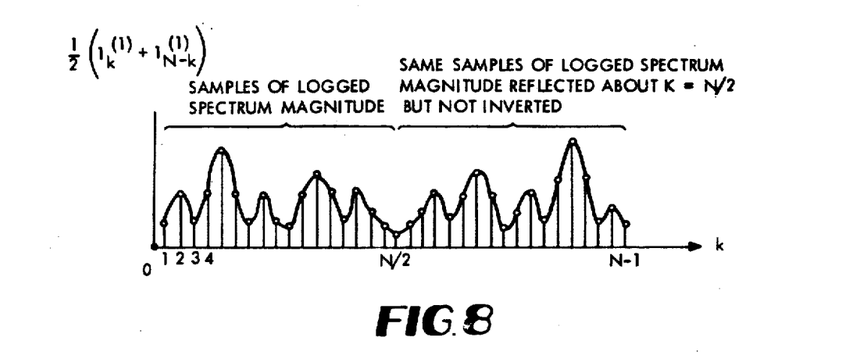
FIG. 8 is a graph illustrative of the logged spectrum magnitude of the samples shown in FIG. 7.
Figure 9:
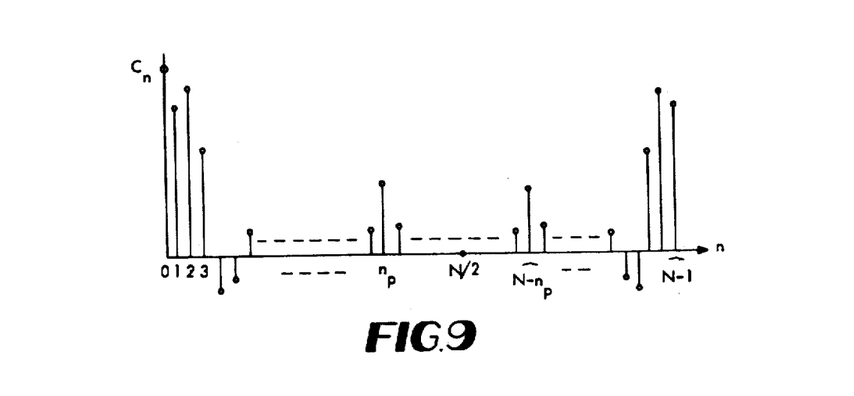
FIG. 9 is a graph illustrative of the cepstrum of the samples shown in FIGS. 7 and 8.

The even part of $I_k^{(1)}$ which is outputted from the even function generator 82 corresponds to $\frac{1}{2}(I_k^{(1)} + I^{(1)}_{N-k})$ which for a voiced speech input typically appears as the sampled function shown in FIG. 8. The term $\frac{1}{2}(I_k + I_{N-k})$ comprises the logged spectrum magnitude of the signal to be transmitted and is a purely even function of k, centered around $k = N/2$. It will have a non-zero discrete cosine transform $C_n$ and an identically zero discrete sine transform. Thus, the Fourier transform of $\frac{1}{2}(I_k + I_{N-k})$ is $C_n$ and comprises one of the outputs obtained from the E/O section 80. A typical $C_n$ function is shown in FIG. 9. These points designate samples of the cosine transform of the logarithm of the magnitude spectrum of the input speech signal. The function $C_n$ is "even" and is referred to as the "cepstrum" of the input speech signal samples $R_k^{(1)}$. The samples of $C_n$ for $n = 0, 1, 2, 3, \ldots 18$, are used as the spectrum envelope information to be transmitted and as such is coupled to the quantizer section 54 and to a pitch detection and the voicing logic section 86.

Returning now to the discrete Fourier transform set forth in equation (2), the following is intended to demonstrate exactly how each of the inputs and outputs discussed above is obtained from the DFT transform.

First, the identity $$e^{-j\frac{2\pi nk}{N}} = \cos\left(\frac{2\pi nk}{N}\right) - j\sin\left(\frac{2\pi nk}{N}\right) \quad (3)$$

is substituted into equation (1), obtaining:

$$S_n^{(2)} = \sum_{k=0}^{N-1} \left\{ R_k^{(1)} \cos\left(\frac{2\pi nk}{N}\right) - jR_k^{(1)} \sin\left(\frac{2\pi nk}{N}\right) \right. \quad (4)$$
$$\left. + jI_k^{(1)} \cos\left(\frac{2\pi nk}{N}\right) + I_k^{(1)} \sin\left(\frac{2\pi nk}{N}\right) \right\}$$

At the end of each data pass or operation of the FFT section 78, the output complex vector $S_n^{(2)}$ appears in two sets of N storage locations each. One set of N memory locations contains the real part of $S_n^{(2)}$ given by:

$$R_n^{(2)} = \sum_{k=0}^{N-1} \left\{ R_k^{(1)} \cos\left(\frac{2\pi nk}{N}\right) + I_k^{(1)} \sin\left(\frac{2\pi nk}{N}\right) \right\} \quad (5)$$

The other set of N memory locations contains the imaginary part of $S_n^{(2)}$ given by:

$$I_n^{(2)} = \sum_{k=0}^{N-1} \left\{ -R_k^{(1)} \sin\left(\frac{2\pi nk}{N}\right) + I_k^{(1)} \cos\left(\frac{2\pi nk}{N}\right) \right\} \quad (6)$$

In each case the two sets of registers are numbered $n = 0, 1, 2, 3, \ldots N-1$.

The E/O separator section 80 operates on $R_n^{(2)}$ to produce the even and odd parts of $R_n^{(2)}$. The even part corresponds to:

$$\frac{R_n^{(2)} + R_{N-n}^{(2)}}{2} = \sum_{k=0}^{N-1} R_k^{(1)} \cos\left(\frac{2\pi nk}{N}\right) = R_n \quad (7)$$

$R_n$ comprises the real part of the spectrum of $R_k^{(1)}$, the analyzed speech waveform. The odd part of $R_n^{(2)}$ corresponds to:

$$\frac{R_n^{(2)} - R_{N-n}^{(2)}}{2} = \sum_{k=0}^{N-1} I_k^{(1)} \sin\left(\frac{2\pi nk}{N}\right) = 0 \quad (8)$$

which is the unused part of the transform. The E/O separator section 80 similarly operates on $I_n^{(2)}$ to produce the even part of $I_n^{(2)}$ which corresponds to:

$$\frac{I_n^{(2)} + I_{N-n}^{(2)}}{2} = \sum_{k=0}^{N-1} I_k^{(1)} \cos\left(\frac{2\pi nk}{N}\right) = C_n \quad (9)$$

where $C_n$ is the cepstrum. The odd part of $I_n^{(2)}$ corresponds to:

$$\frac{I_n^{(2)} - I_{N-n}^{(2)}}{2} = \sum_{k=0}^{N-1} R_k^{(1)} \sin\left(\frac{2\pi nk}{N}\right) = I_n \quad (10)$$

$I_n$ comprises the imaginary part of the spectrum of $R_k^{(1)}$, the analyzed speech waveform.

Thus there are basically four parts of the FFT output as given by equations 7, 8, 9 and 10. Equations 7 and 8 provide the real and imaginary part, respectively, of the Fourier spectrum of the speech input waveform $R_k^{(1)}$ which is to be analyzed and transmitted while equation 9 provides the cepstrum function.

As noted above, the $I_k^{(1)}$ input to the FFT section 78 comprises the even function of the logged spectrum magnitude $M_n$ at the n-th frequency. $M_n$ is defined as:

$$M_n = \sqrt{R_n^2 + I_n^2} \quad (11)$$

where $R_n$ and $I_n$ are defined in equations 7 and 10. In practicality, inasmuch as binary numbers are being dealt with, it is more desirable to use the approximation (MAX + ¼ MIN) to avoid squaring the numbers $R_n$ and $I_n$. This can be mathematically stated as follows:

$$M_n = \max\{|R_n|,|I_n|\} + \tfrac{1}{4}\min\{|R_n|,|I_n|\} \quad (12)$$

Equation 12 indicates that either the magnitude of $R_n$ or the magnitude of $I_n$, whichever is greater, is taken to which is added one fourth of $|R_n|$ or $|I_n|$ whichever is less. In general other approximations such as the ¼ may be replaced by ½ may be utilized without changing the general idea; however, the ¼ factor is simply the factor which gives the best approximation to $\sqrt{R_n^2+I_n^2}$. Apparatus for performing this function is designated by reference numeral 88 in the spectrum processor section 50.

In addition to being fed to the logging algorithm computer 84, the spectrum magnitude of the n-th frequency is fed to the pitch extractor section 52 and respectively to three portions thereof, namely an energy sum noise stripper 90, a low band sum circuit 92, and a high band sum circuit 94. The noise stripper 90 is utilized in order to increase the accuracy of the voicing under heavy acoustic background noise conditions and provides a noise threshold which establishes a minimum level for the low band and the high band, for example, during 4 second intervals. Since it is highly unlikely that speech would be sustained for greater than 4 second intervals, the minima can be considered measurements of the magnitude of noise in the two bands. Throughout each 4-second estimation period, the noise estimates from the previous estimation period are subtracted from the high band and low band energy sums. The circuits 92 and 94 comprise an implementation of the simple subtraction algorithm which is a crude approximation of the following pair of expressions:

$$S_{LO} = \sqrt{M_{LO}^2 - N_{LO}^2} \quad (13)$$

$$S_{HI} = \sqrt{M_{HI}^2 - N_{HI}^2} \quad (14)$$

where S is the speech energy sum, M is the measured energy sum, and N is the estimated noise energy sum. These equations are derived from the relationship:

$$M^2 = S^2 + N^2 \quad (15)$$

Accordingly the noise stripper operates to improve the performance of the pitch extractor 52.

The outputs of the summers 92 and 94 are logged in apparatus denoted by reference numerals 96 and 98 which correspond to the logging algorithm computer 84, referred to above, and may be comprised of, for example, a Sylvania Electric Products, Inc., ACP-1 computer wherein the log function is approximated by ten inscribed straight lines. This logged low and high band sum information is then fed into the pitch detection and voicing logic circuit 86, which additionally receives an input of the cepstrum $C_n$ outputted from the E/O section 80.

Pitch detection is accomplished by first testing the voicing detection criterion and after voicing has been detected, searching the cepstrum function in a predetermined search range for a peak that occurs whenever the input speech is voiced. The position of the tracking peak in the search range is then taken to be fundamental pitch period of the speaker's voice. This concept is known and described in detail in the afore-mentioned U.S. Pat. No. 3,681,530.

This pitch value which is extracted is fed to the modulator 56 along with quantized cepstrum values outputted from the quantizer section 54 which receives a set of cepstrum coefficients $C_n$ that characterize the spectral envelope of the input speech data. Quantizer 54 acts to remove normalization gain of the cepstrum coefficients after which they are scaled, quantized and fed to the modulator 56.

The quantizer 54 is designed as a dual updating rate quantizer and operates on the theory that the hearing process is not sensitive to fine detail in the spectrum shape during rapid transition, i.e. when the spectrum shape is changing rapidly. At these times it is important to faithfully transmit the rapid changes of the general spectrum shape by sampling those coefficients which determine the general shape and in particular the overall energy level as often as possible. Indeed at times of such rapid change in spectral content the usual assumptions of quasi-stationarity in the speech spectrum breakdown completely. The theory further states that during relatively stable sounds such as near the middle of vowels, the hearing mechanism will be quite sensitive to spectrum envelope detail. At such times, however, the spectrum envelope is changing relatively slowly so that the higher order coefficients which convey the required spectral detail may be sampled at a lower rate.

The cepstrum vocoder concept set forth above is ideally suited to take advantage of these affects since the very low order coefficients, i.e. the first four or five cepstrum values, convey the general spectrum envelope shape with the zero delay value; of course, carrying the overall gain or energy level. The higher order coefficients from the fourth or fifth coefficient out to about 3 milliseconds define the final spectrum envelope in detail.

Thus advantage can be taken of the effects postulated in the above discussion in a simple way by sampling the first four or five cepstrum values at the highest practical rate, i.e. every frame, while the rest of the spectrum coefficients are sampled on an interleaved basis every other frame. This automatically provides the most frequent possible sampling of the overall spectrum shape during intervals of rapidly changing spectral content together with many higher order spectrum coefficients sampled at a lower rate to provide faithful reproduction of fine spectrum envelope detail during the more nearly steady state sounds.

The modulator section 56 accordingly includes a frame formatter of the quantized cepstrum and pitch parameters which are repetitively updated for example 50 times per second, into a multi-bit digital word containing, for example, 7 bits of pitch and 41 bits of cepstrum information in the 2400 bit per second mode and 6 bits of pitch and 30 bits of cepstrum in the 1200 bit per second mode. The data thus formatted is fed to a phase shift control unit 102 which is coupled to a table look-up modulator 104. The phase control unit 102 and the table look-up modulator operate to generate in digital form a first and second plurality of tones in a four phase DPSK operational mode as described in the above referenced U.S. Pat. No. 3,617,941. Table I discloses a typical tone generation output for a 25 tone look-up modulator which accepts input data at a rate of 2400 bits per second. These direct and heterodyned sampled waveforms generated in the table look-up modulator 104 are outputted to the digital analog converter 58 which generates and holds the analog output value of the tone frequency until the next frequency sample is fed thereto. The lowpass filter 60 coupled to the D/A converter 58 is used to eliminate unused tones generated by the table look-up modulator 104. Thus the transmitted signal comprises an analog modem waveform generated from a 25 tone stack.

Figure 10:
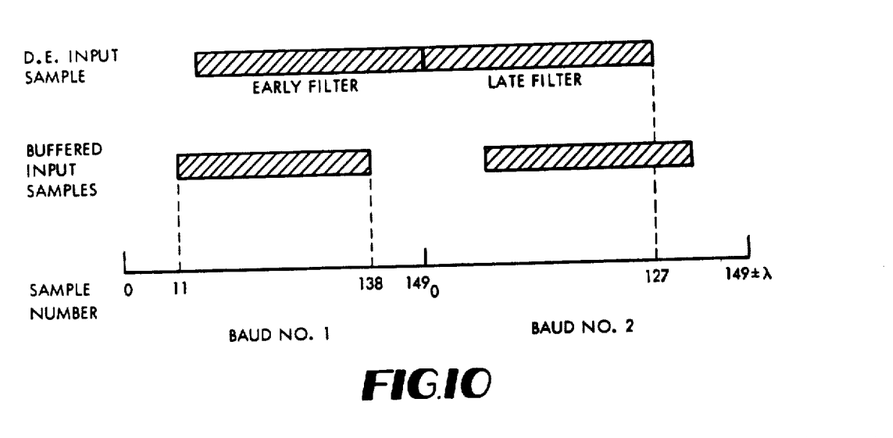
FIG. 10 is a graph illustrative of the data input timing diagram for the receive mode of operation.

Referring now to the receive mode and FIG. 6, modem input signals from a communications channel, not shown, are fed into the aforementioned analog input processor 40 including the gain control circuit 70 and low pass filter 72 and then to the analog to digital converter 42. The digitized modem input is fed to the same 128 sample buffer storage 44 as before, however, it is now also fed into the sync detector section 46 which consists of a difference equation filter 106 and a baud synchronization circuit 108. The input timing provided by the sync detector 46 is shown in FIG. 10 for a 2 baud interval. The 128 sample buffer data in the buffer store 44 is taken from the center of the baud so that the input data is isolated as much as possible from the baud transition. The data in this 128 sample orthogonal window is transformed once per baud to provide the Fourier analysis of the input tones which is necessary for demodulation.

TABLE I

| Modem Tone | I | $f_s/2$ Generation Frequency | Heterodyne Frequency | Final Output Frequency |
|---|---|---|---|---|
| 1 | 10 | 562.5 Hz | — | 562.5 Hz |
| 2 | 12 | 675.0 | — | 675.0 |
| 3 | 13 | 731.25 | — | 731.25 |
| 4 | 14 | 787.5 | — | 787.5 |
| 5 | 15 | 843.75 | — | 843.75 |
| 6 | 16 | 900.0 | — | 900.0 |
| 7 | 17 | 956.25 | — | 956.25 |
| 8 | 18 | 1012.5 | — | 1012.5 |
| 9 | 19 | 1068.75 | — | 1068.75 |
| 10 | 20 | 1125.0 | — | 1125.0 |
| 11 | 21 | 1181.25 | — | 1181.25 |
| 12 | 22 | 1237.5 | — | 1237.5 |
| 13 | 23 | 1293.75 | — | 1293.75 |
| 14 | 25 | 1406.25 | — | 1406.25 |
| 15 | 26 | 1462.5 | — | 1462.5 |
| 16 | 27 | 1518.75 | — | 1518.75 |
| 17 | 10 | 562.5 | 2137.5 Hz | 1575.0 |
| 18 | 9 | 506.25 | 2137.5 | 1631.25 |
| 19 | 8 | 450.0 | 2137.5 | 1687.5 |
| 20 | 7 | 393.75 | 2137.5 | 1743.75 |
| 21 | 6 | 337.5 | 2137.5 | 1800.0 |
| 22 | 5 | 281.25 | 2137.5 | 1856.25 |
| 23 | 4 | 225.0 | 2137.5 | 1912.5 |
| 24 | 3 | 168.75 | 2137.5 | 1968.75 |
| 25 | 2 | 112.5 | 2137.5 | 2025.0 |

The interval designated DE input samples in FIG. 10 illustrates the gating of input samples to the difference equation filter 106. In each 2 baud interval, the last 128 samples of the first baud and the first 128 samples of the second baud are fed into an integrate and dump difference equation implemented thereby. The algorithm used to process the synchronization input data is represented by the following difference equation:

$$y_{k+1} - 2(\cos \omega_p T)y_k + y_{k-1} = g_k \tag{16}$$

where $\omega_p$ is the radian center frequency of the filter, T is the sampling period, and $g_k$ is the input. This difference equation has a solution:

$$y_k = \frac{1}{\sin \omega_p T} \sum_{n=1}^{k} g(n) \sin(k-n) \omega_p T + C_1 \cos(k\omega_p T) + C_2 \sin(k\omega_p T) \tag{17}$$

where the last two terms represent the transient part of the solution and may be dropped by starting the difference equation with zero initial conditions. Thus when the filter 46 is excited at its center frequency, the envelope amplitude is directly proportional to the input amplitude and the number of input samples processed and the phase of the output is the same as the input phase. In the synchronization process, 127 samples of the input are processed while the 128th sample is set to zero to allow the difference equation to ring once.

Figure 11:
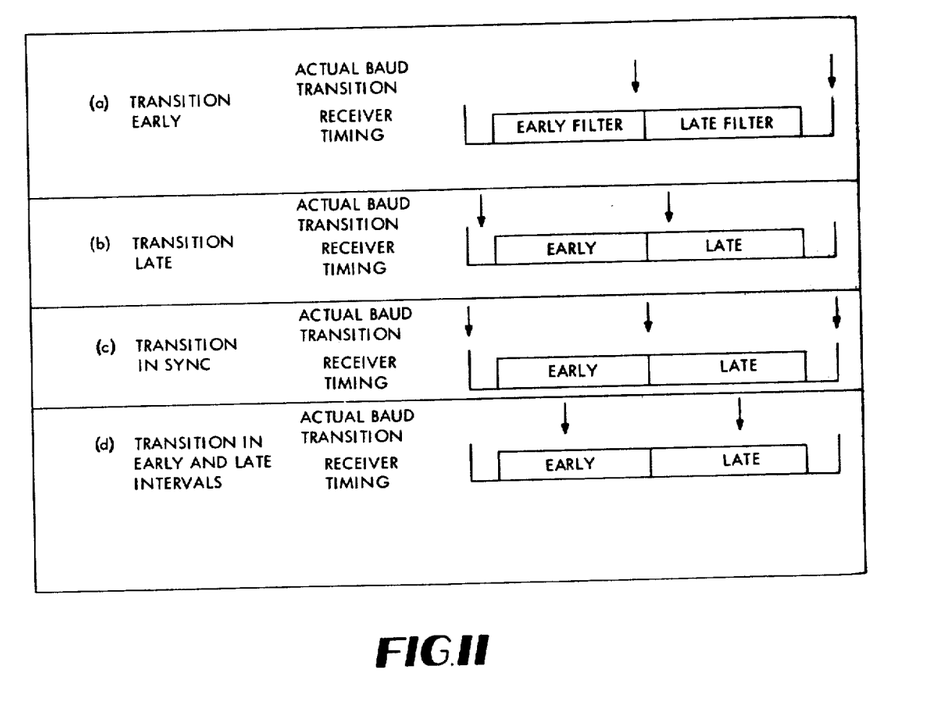
FIG. 11 is a graph illustrative of the synchronization alignment for the system during the receive mode.

Baud synchronization is accomplished by adding a correction $\pm\lambda$ to the number of samples processed every other baud (FIG. 10). The difference equation filter is adapted to detect four alignments of the actual received baud with respect to the receiver timing. These conditions are diagrammed in FIG. 11. In the instances (a) and (b) of FIG. 11, energy is measured in only one of the two intervals, the synchronization correction $\pm\lambda$ is calculated from the following expression:

$$\lambda = C(m_l - m_e) \tag{18}$$

where $m_l$ is the magnitude of the late filter, $m_e$ is the magnitude of the early filter, and C is a synchronization constant. The constant C is chosen so that the maximum value of $\lambda$ during the lock-in phase synchronization is three of four samples. Thus when the received baud is in sync, neither filter will measure energy and the synchronization correction goes to zero. This condition is illustrated as portion (c) of FIG. 11. Since the number of samples monitored by the early and late filters exceeds the number of samples in a baud, it is possible that a baud transition will lie in both the early and late filters, as shown in FIG. 11(d). This condition occurs only during initial synchronization lock-up and could prevent the synchronization acquisition. To prevent such an occurrence, the values of the early and late magnitudes are checked before being utilized in equation 18. If both magnitudes exceed an experimentally determined threshold, the value $\lambda$ is forced to $+1$. In this manner the program will tend to walk out of the intermediate position. When the input to the receive mode program is set to its normal level, synchronization acquisition is achieved in a very short time span. When the input level is reduced to zero, as might be experienced in a deep signal fade, the correction goes to zero. Thus synchronization will be maintained in a deep fade as long as the accuracy of the transmitter and receiver clocks are sufficient.

Considering again the FFT computer 26, it now operates to implement a 64 point complex FFT while accepting samples at the real only input and thus is capable of performing a 128 point sample transform which is used twice, first to analyze the incoming baud for demodulation, and second to generate the impulse response from the decoded cepstrum. The following discussion illustrates the relationships necessary to obtain the discrete Fourier transform of 128 sample (2N) real only input from the N=64 complex sample FFT algorithm. The input is packed into the complex input vector of the FFT and the output of the FFT is even/odd separated and weighted to form the N sample, non-symmetric DFT of the real value input.

The DFT of a 2N sample real input, $x(t_n)$, $n=0, 1, \ldots 2N-1$ is expressed in the following equation.

$$X(f_k) = \frac{1}{2N} \sum_{n=0}^{2N-1} e^{-i\frac{\pi k}{N} n} x(t_n), k = 0, 1, \ldots, N-1 \quad (19)$$

Since the input is real, the real part of $X(f_k)$ is even symmetric about N/2 and the imaginary part of $x(f_k)$ is odd symmetric about N/2. Because of these symmetries, the output $X(f_k)$ is described for $k \leq N-1$.

The summation of equation 19 may be separated into two summations, the first over the even n samples of the input and the second over the odd n samples of the input according to the following expression:

$$x(f_k) = \frac{1}{2N} \sum_{n=0}^{N-1} e^{-i\pi \frac{k2n}{N}} x(t_{2n}) + \quad (20)$$

$$\frac{1}{2N} \sum_{n=0}^{N-1} e^{-i\pi \frac{k(2n+1)}{N}} x(t_{2n+1})$$

Substituting the Identity:

$$e^{-i\pi \frac{k(2n+1)}{N}} = e^{-i\pi \frac{k}{N}} e^{-i2\pi \frac{kn}{N}} \quad (21)$$

Equation 20 may be rewritten as:

$$X(f_k) = \frac{1}{2} \frac{1}{N} \left[ \sum_{n=0}^{N-1} e^{-i2\pi \frac{kn}{N}} x(t_{2n}) \right] + \quad (22)$$

$$\frac{1}{2} e^{-i\pi \frac{k}{n}} \left[ \frac{1}{N} \sum_{n=0}^{N-1} e^{-i2\pi \frac{k}{n}} x(t_{2n+1}) \right]$$

The first bracketed term is the DFT of the even sample part of the input and the second bracketed term is the DFT of the odd sample part of the input. Thus equation 22 can be rewritten as $$X(f_k) = \frac{1}{2} F[x(t_{2n})] + \frac{1}{2} e^{-i\pi \frac{k}{N}} F[x(t_{2n+1})] \quad (23)$$

Equation 23 thus provides the basis for the real input transform algorithm.

Accordingly, using this algorithm, efficient use can be made of the complex FFT when the input is a single real valued function. At the cost of even/odd separating the output and applying a weighting function, an N complex sample FFT can be used for a 2N sample real input FFT, resulting in an approximate 50% reduction in running time and working storage.

Figure 12:
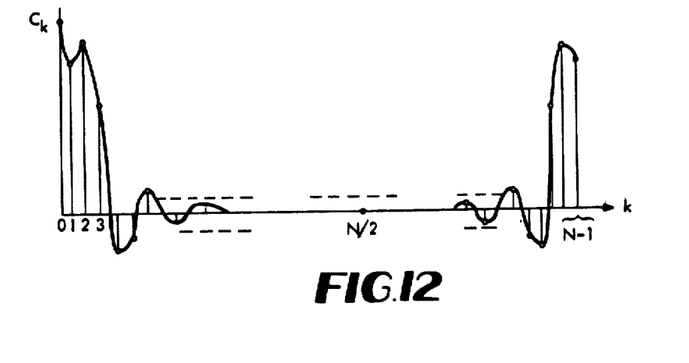
FIG. 12 is a graph illustrative of the cepstrum samples for a modem signal received by the subject invention.

Referring now back to FIG. 6, 128 samples of the modem waveform are transferred from the buffer 44 to the real input $R_k^{(1)}$ where the samples are placed in the working storage, not shown, of the FFT section 78, whereupon the transform produces 64 non-symmetric complex output vectors of which 25 are used to provide modem tone analysis. Since the input is real, the output vector will consist of real and imaginary parts $R_n$ and $I_n$ which is fed into a four phase DPSK decoder 110 which is operable to provide packed cepstral coefficients which are fed to a cepstrum decoder 112. The decoder is operable to form cepstral coefficients by applying inverse scaling and quantizing operations such as described with respect to the quantizer 54 shown in FIG. 5. The received cepstrum is decoded into even function coefficients $C_k$ and fed to the summer 64 along with odd function coefficients $M_k$ representative of the spectral envelope, which results from the real part $R_n$ of a previous path of data through the FFT computer 26 while performing a 128 point real DFT. The spectral envelope samples $M_k$ is shown in FIG. 12 and results from the operation of the spectrum processor section 68 on the logged spectral envelope $\overline{M}_n$, i.e. the cosine transform of the received cepstrum $C_k$. The spectrum processor section 68 includes means 114 and 116 for performing the inverse process of the logging algorithm and for multiplying the spectral envelope by a series of random positive and negative unit impulses when the spectral envelope represents an unvoiced section of speech.

Figure 13:
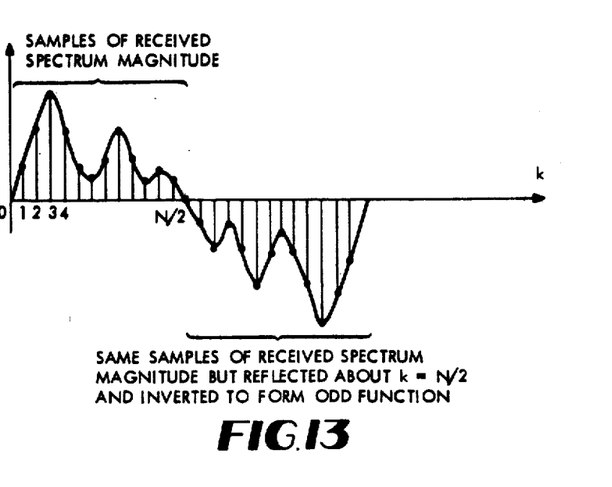
FIG. 13 is a graph illustrative of the sampled received spectrum magnitude of the modem signal received.
Figure 14:
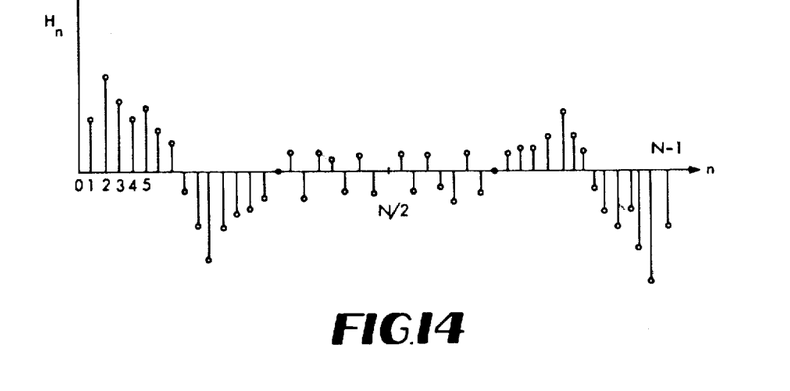
FIG. 14 is a graph illustrative of the sampled synthesizer impulse response of the received modem signal.

The imaginary part of the second 128 point real DFT which comprises the part $I_n$ comprises the impulse response $H_n$ which is the sine transform of the spectral magnitude $M_k$ and is illustrated, for example in FIG. 13. Since the impulse response is derived from the Fourier transform of the spectral magnitude, the impulse response samples are characterized by the diagram of FIG. 13. For voiced synthesis, the impulse response data samples have applied thereto Hanning weighting in a circuit 118, while for unvoiced synthesis the impulse response is fed unweighted into the synthesizer section 120. An impulse quieting response circuit is preferably inserted between the Hanning weighting circuit 118 and the synthesizer 122 to remove any low level noise which may arise from time to time, particularly when an unvoiced speech input is present. In addition to the impulse response, the synthesizer 120, a typical example of which is disclosed in U.S. Pat. No. 3,681,530, also receives a pitch error correction signal from the block 122 which is coupled to the four phase DPSK decoder 110 which operates to minimize the effect of error rate on the regenerated pitch parameter for values of pitch which lie outside the range of the pitch detector and are thus trapped before the pitch is transmitted to the synthesizer. The circuit 122 operates in such a fashion that when activated the previous value of pitch received is transmitted to the synthesizer 120. The synthesizer 120 operates in a well known manner to provide digitally coded signals which when fed to the digital to analog converter 58 provides synthesized output speech from the modem input originally.

Thus what has been shown and described in an all digital processor which combines the functions of a vocoder and a modem in a half duplex mode of operation while making maximum practical use of a single FFT algorithm which is used for both vocoder and modem processing in both the transmit and receive modes of operation.

While there has been shown and described what is at present considered to be the preferred embodiment of the subject invention, modifications and alterations will readily occur to those skilled in the art. It is not desirable, therefore, that the invention be limited to the specific arrangements shown and described, but it is intended to cover all such modifications as fall within the spirit and scope of the invention as defined in the appended claims.

What is claimed is:

1. In signal processing apparatus including means implementing both vocoder and modem functions in a half duplex mode of operation in response to a voice signal in a transmit mode and a modem signal in a receive mode, the improvement comprising:

input means selectively coupled to the voice signal and the modem signal to provide respective digital data sequences therefrom;

common computer means coupled to said input means implementing a single fast Fourier transform algorithm adapted to perform a first multi-point complex fast Fourier transform in the transmit mode and to perform a second multi-point complex fast Fourier transform in the receive mode, said first transform being operable to effect spectrum and cepstrum analysis of the digital data sequence of the voice signal to provide pitch detection and cepstral encoding signals therefrom, and said second transform being operable to effect demodulation of the digital data sequence of the modem signal to provide pitch and impulse response signals therefrom;

first circuit means coupled to said common computer means in the transmit mode and being responsive to the pitch detection and cepstral encoding signals to generate a plurality of information bearing tone waveforms to provide a modem signal in digitized form;

first feedback circuit means connected to the output of said common computer means for feeding back a processed spectrum signal in the transmit mode to the input of said common computer means;

second circuit means coupled to said common computer means in the receive mode and being responsive to the pitch and impulse response signals to generate an output speech waveform in digitized form;

second feedback means connected to the output of said common computer means for feeding back a processed spectrum signal in the receive mode to the input of said common computer means; and output means selectively coupled to said first and second circuit means in synchronism with said input means to provide an analog signal of either a modem signal in the transmit mode or a voice signal in the receive mode.

2. The signal processing apparatus as defined by claim 1 wherein said second multi-point complex fast Fourier transform providing pitch and impulse response signals comprises two routines of a real input discrete Fourier transform.

3. The signal processing apparatus as defined by claim 1 wherein said first multi-point complex fast Fourier transform comprises an N-point FFT and wherein said second multi-point complex fast Fourier transform comprises an N/4 FFT used to perform an N/2 point real input discrete Fourier transform, the latter being used in a first routine for demodulating the digitized modem input signal and in a second routine to transform decoded cepstral parameters resulting from said demodulation into a log spectrum and to transform said spectrum into said impulse response signals.

4. The signal processing apparatus as defined by claim 1 wherein said first multi-point complex transform comprises a 256-point fast Fourier transform and wherein said second multi-point complex transform comprises a 64-point fast Fourier transform used to effect a 128-point real input discrete Fourier transform.

5. The signal processing apparatus as defined by claim 1 wherein said input means includes analog to digital converter means being operable to generate an input data sequence from either said voice signal or said modem signal inputted thereto and digital data storage means coupled to said analog to digital converter means and being operable to couple the digital data sequence to said computer means in successive sets of input samples; and wherein said output means comprises digital to analog converter means for converting the digitized waveforms from said first and second circuit means to respective analog representations thereof.

6. The signal processing apparatus as defined by claim 1 wherein said first circuit means comprises modulator means incorporating a table look-up differentially coherent phase shift keying modulation routine which is operable to generate said plurality of information bearing tones.

7. The signal processing apparatus as defined by claim 1 wherein said second circuit means includes synthesizer means responsive to said pitch and impulse response signals which is operable to generate said output speech waveform in digitized form.

8. The signal processing apparatus as defined by claim 1 and additionally including speech re-processor means coupled between said input means and said computer means in said transmit mode, said speech preprocessor means including means for normalizing said digital data sequence and providing Hanning weighting to said digital data prior to being fed to said computer means.

9. A signal processing apparatus as defined by claim 1 and additionally including means coupled between said computer means and said second circuit means in said receive mode for providing Hanning weighting to said impulse response signals.

10. The signal processing apparatus as defined by claim 1 and additionally including synchronization means between said input means and said computer means in said receive mode for regulating the digital data sequence inputted to said computer means.

* * * * *